June 22, 1943.　　J. G. VINCEN.　　2,322,676
MOTOR VEHICLE
Filed April 26, 1939　　4 Sheets-Sheet 1

INVENTOR.
Jesse J. Vincent
BY Tibbetts & Hart
ATTORNEYS

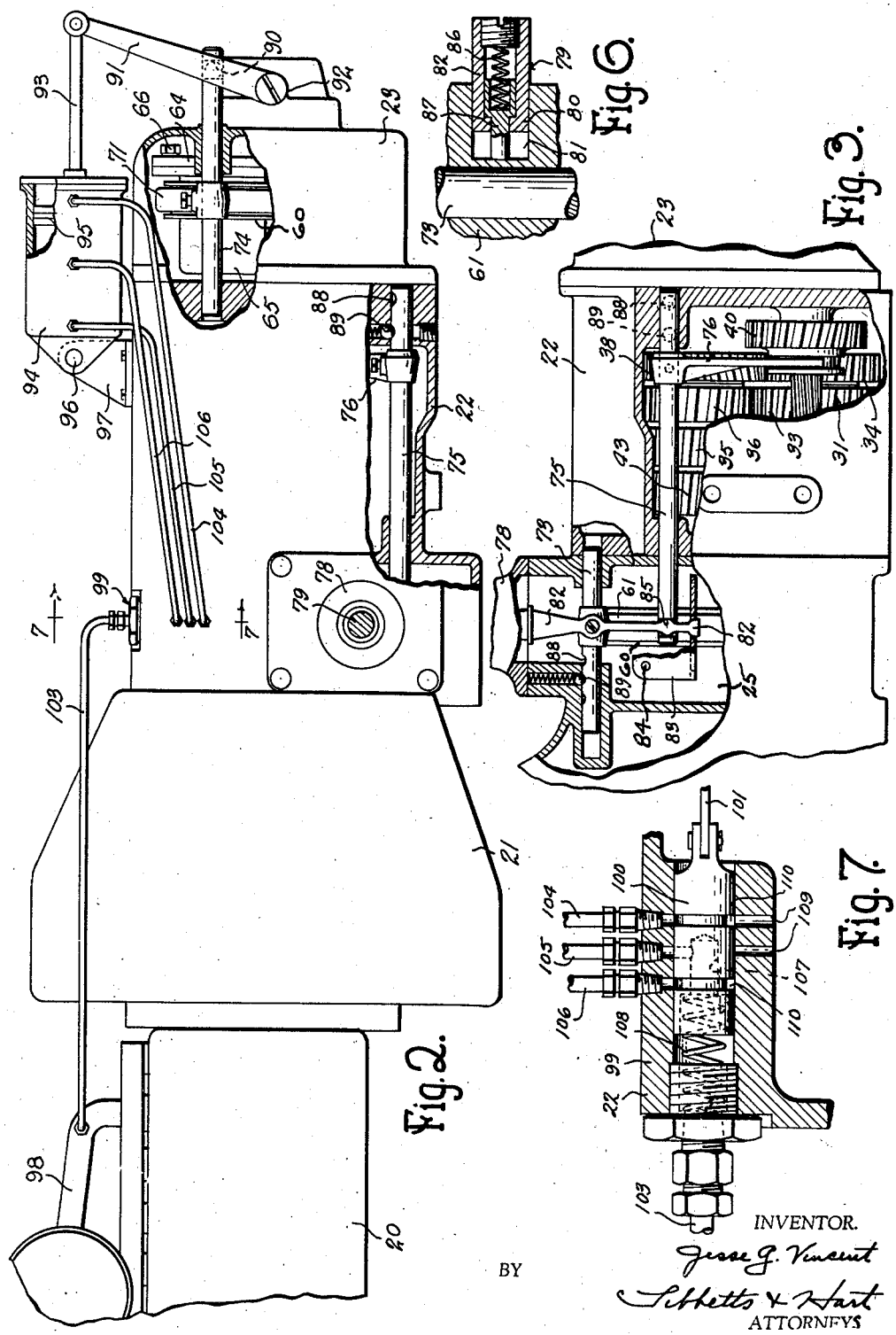

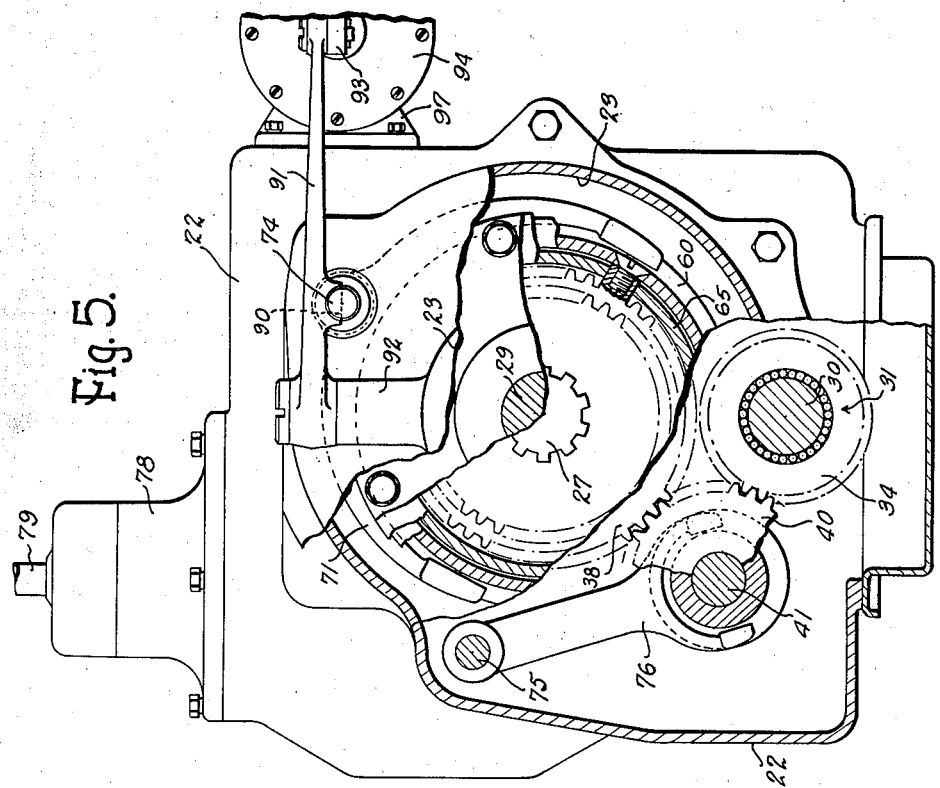

June 22, 1943. J. G. VINCENT 2,322,676
MOTOR VEHICLE
Filed April 26, 1939 4 Sheets-Sheet 4

INVENTOR.
Jesse G. Vincent
BY
Sibbetts & Hart
ATTORNEYS

Patented June 22, 1943

2,322,676

UNITED STATES PATENT OFFICE 2,322,676

MOTOR VEHICLE

Jesse G. Vincent, Grosse Pointe, Mich., assignor to Packard Motor Car Company, Detroit, Mich., a corporation of Michigan Application April 26, 1939, Serial No. 270,167

7 Claims. (Cl. 74—330)

This invention relates to power transmission mechanism and more particularly to the control of change speed gearing for use in motor driven vehicles.

In some forms of change speed gearing employed with motor driven vehicles, a plurality of clutches are actuated to select the gear train through which the drive is established and an object of this invention is to provide control mechanism for selectively engaging and disengaging the clutches to secure the desired drive in any one of several speeds.

Another object of the invention is to selectively control clutches in change speed gearing by a pair of mechanisms one of which is actuated manually and the other of which is actuated by pressure under control of the manually actuated mechanism.

Another object of the invention is to provide control mechanism for a pair of shiftable clutch members in a change speed gearing that will engage a pair of clutches in sequence.

Still another object of the invention is to provide a control for two pairs of clutches in change speed gearing in which a manually actuated lever selectively engages a clutch in one pair and actuates a valve in a fluid pressure system for selectively shifting a clutch in the other pair.

Other objects of the invention will appear from the following description taken in connection with the drawings, which form a part of this specification, and in which:

Fig. 2 is a top plan view of the power unit and the change speed gearing, partly broken away to show a shift rail mechanism;

Fig. 3 is a fragmentary side elevational view, partly broken away, of the change speed mechanism;

Fig. 4 is a sectional view through the change speed mechanism taken on line 4—4 of Fig. 1;

Fig. 5 is a sectional view taken on line 5—5 of Fig. 1;

Fig. 6 is a sectional view of a portion of a shift mechanism taken on line 6—6 of Fig. 4;

Fig. 7 is a sectional view of the fluid pressure control valve structure taken on line 7—7 of Fig. 2;

Figure 1:
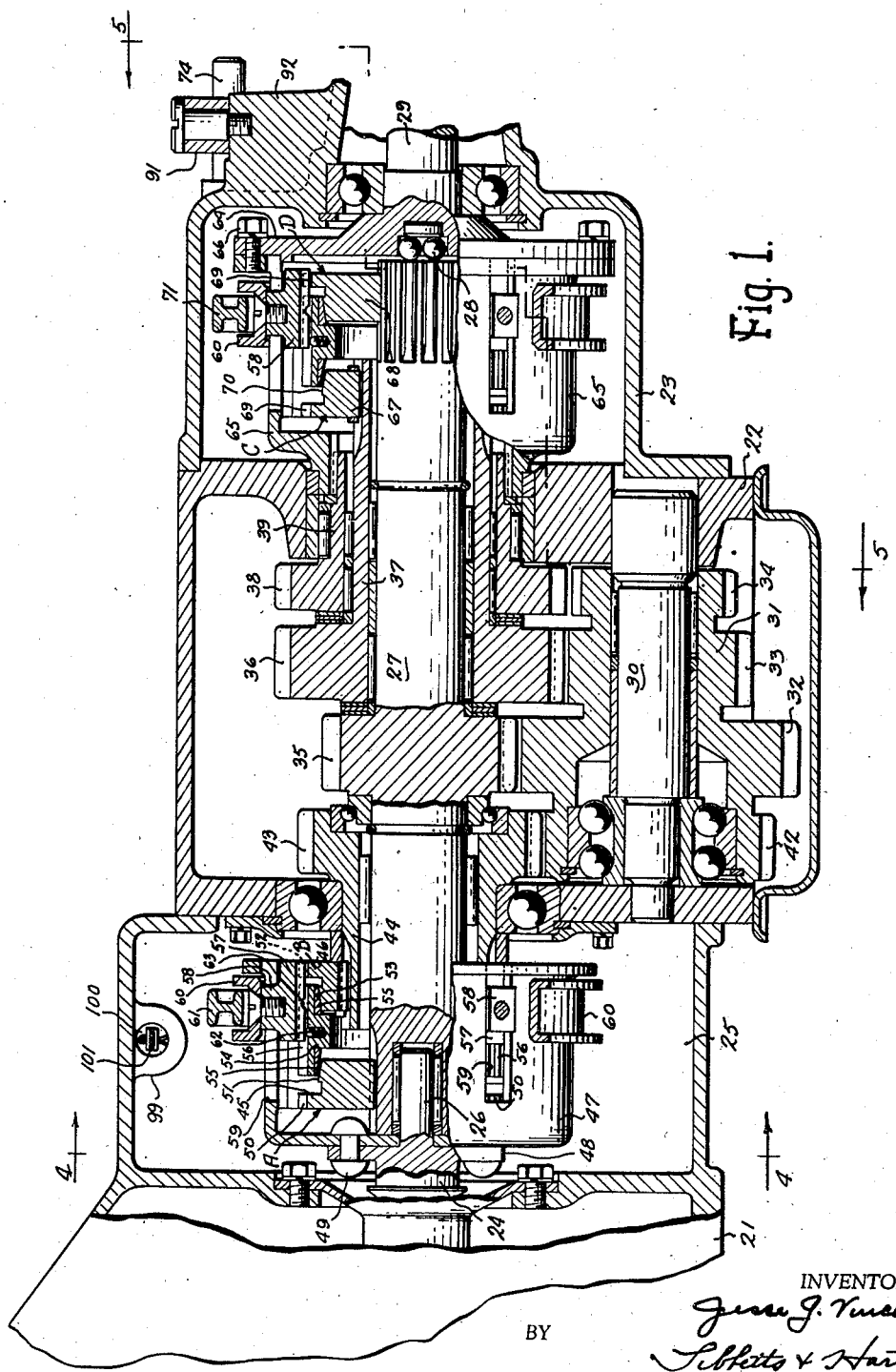
Fig. 1 is a vertical sectional view through a motor vehicle change speed mechanism with which the invention is associated.

The change speed mechanism and the control therefor herein described can be applied to motor vehicles of conventional design and only the parts of the vehicle necessary for an explanation of the invention are illustrated.

The power transmitting unit consists of a conventional engine 20, a housing 21 containing a flywheel and a main clutch, not shown, and a portion of the clutch mechanism of the change speed mechanism, a change speed casing 22 and a casing 23 containing another portion of the clutch mechanism for the change speed gearing. These several casings are arranged preferably in alignment in the order named and are secured together as a unitary structure. The main clutch controlled drive shaft 24 extends into a chamber 25 formed by housing 21 and terminates in a pilot 26 on which the forward end of a driven shaft 27 is journaled. This shaft 27 extends through casing 22 and into casing 23 where its rear end engages thrust bearings 28 mounted in the hollow end of a tail shaft 29. In casing 22 is also arranged a lay shaft 30 having its ends mounted in the end walls of the casing, and rotatably mounted on the lay shaft is a gear cluster 31 comprising gears 42, 32, 33 and 34. The gear 32 is arranged in constant mesh with a gear 35 formed on the driven shaft 27, gear 33 is in constant mesh with a gear 36 fixed on the end of a sleeve 37 that is rotatably mounted on the driven shaft 27. Gear 34 is arranged in alignment with a gear 38 fixed on the sleeve 39 rotatably mounted upon the gear sleeve 37, and an idler gear 40 is slidably splined on a shaft 41 carried in the change speed gearing casing for establishing a driving relation between gears 34 and 38. Gear 42 meshes with gear 43 fixed on a sleeve 44 that extends through the front wall of the change speed gear casing and is rotatably mounted on the driven shaft 27.

Clutch means for selectively establishing the drive from shaft 24 to shaft 29 through the change speed gearing is arranged in the chamber 25 of casing 21 and within the casing 23. A clutch element 45 is splined on the forward end of the driven shaft 27 and a clutch element 46 is splined on the forward end of the sleeve 44. These clutch elements are contained within a drum 47 fixed to a flanged end 48 of the shaft 24 by suitable means such as rivets 49. The clutch element 45 is formed with peripheral teeth 50 and with a cone friction surface 51. The clutch element 46 is formed with peripheral teeth 52 and a friction cone surface 53. Between these clutch elements 45 and 46 is arranged a clutch structure consisting of an axially shiftable hub section 54 having a pair of friction end elements 55 and a toothed periphery 56. An outer ring member 57 surrounds the hub and has internal teeth meshing in sliding relation with the teeth 54. This outer ring member is formed with neck portions 58 that extend through longitudinal slots 59 in the drum 47 and to such neck portions is secured a collar 60 in which a shift yoke 61 is located. Spring pressed balls 62 are carried in the hub element 54 and are arranged to engage in recesses 63 formed in the teeth of the outer ring member 57.

The drum 47 fixed to the drive shaft engages the neck portions of the ring clutch element 57 in a relation to rotate the same therewith, and the toothed relation of this ring clutch member with the clutch hub element 54 causes the shiftable clutch structure to rotate as a unit. When the shiftable clutch structure is in neutral position the balls 62 are seated in the recesses 63, and when the yoke 61 moves the outer ring member forwardly or rearwardly these balls serve to carry the hub 52 with the outer ring 58 until one of the friction elements 55 engages with the cone friction surface on the clutch element being approached. After these friction surfaces engage, continued movement of the ring member 58 will cause the same to move axially relative to the hub member to engage its internal teeth with the teeth of the clutch element toward which it is approaching and of course the engagement of the friction surfaces will in the meantime have caused the shiftable clutch structure to be rotated at the same speed as the clutch element with which it engages to thereby synchronize the parts so that the teeth will not clash when engaged. The front clutch will be designated as A and the rear front clutch will be designated as B, for convenience in a description of the operation.

In the casing 23 is arranged a clutch structure similar to that just described. At the forward end of the tail shaft is a flange 64 to which a drum 65 is fixed by suitable means such as bolts 66, and the forward end of this drum is splined to the rear end of the gear sleeve 39. Within the drum is arranged a forward clutch element 67 splined to the gear sleeve 37 and a rear clutch element 68 splined to the driven shaft 27. These clutch elements are each formed with peripheral teeth 69 and a friction surface 70 for engagement by a shiftable clutch structure corresponding to that at the forward end of the change speed gearings and having the collar 60 engaged by a yoke 71. The forward rear clutch will be designated as C and the rearmost clutch will be designated as D, for convenience in describing the operation of the mechanism. The outer ring member 58 has in this instance neck portions that extend through slots in the drum 65 in a manner similar to that set forth in the description of the two forward clutches A and B.

As a means for controlling the movement of the front and rear shiftable clutch structures I provide two axially movable rails 73 and 74. The rail 73 is slidably carried by the end walls of the chamber 25 and the rail 74 is slidably carried by the front and rear walls of the casing 23. Another rail 75 extends longitudinally of the casing 22 and is axially movable in bearings formed in the front and rear walls of such casing. This rail 75 projects forwardly into the chamber 25. Fixed on the rail 75 is a yoke 76 for engaging the collar portion of the idler gear 40 and the yoke 61 is fixed to the rail 73 to be shifted therewith. Fixed on the rail 74 is the yoke 71 that engages the ring portion 60 of the rear clutch structure. The casing 22 is formed with a tower 78 that is bolted on the top thereof and in which the ball end of the shift lever 79 is pivotally mounted. The lower end of this shift lever is formed with a boss 80 that projects into a recess 81 of the yoke 61 for shifting the rail 73 fore and aft therewith. The lower end 82 of the lever is arranged to extend into an H-slot in a plate 83 fixed to the inner wall of the casing 21 by suitable means such as studs 84. This lower end of the lever 79 lies adjacent a slot 85 in the shift rail 75 so that when thrown into one extreme transverse position it will engage in the slot in relation to shift the rail when the lever is rocked. The lever 79 is urged away from the slot 85 in the rail 75 by a coil spring 86 that bears against a plunger 87. A portion of the plunger and the coil spring is contained within a recess in the boss portion of the lever 79 and a portion of the plunger extends beyond the lever in the slot 81 to engage the yoke 61.

The rail 73 may be provided with notches 88 in which spring pressed retainer balls 89 can seat for holding the rail in position establishing a neutral relation or the several clutch engaging positions, and the rail 75 is provided with similar notches and balls for fixing it in or out of reverse driving position. The extension 82 of lever 79 can be rocked transversely of the casing through the gate in the plate 83 to engage in the slot 85 in the rail 75, and when this is done the actuating connection between the lever and the slot 81 in the yoke 61 is maintained. In order, however, to move the lever into engagement with the rail 75, the pressure of the coil spring 86 must be overcome so that without the exertion of extra pressure in the transverse direction, engagement of the rail 75 by the lever will not take place. As previously stated, the lever is always in actuating relation with the yoke 61 so that when the lever is shifted fore and aft it will carry the collar 60 therewith and when engaged with the rail 75 it will of course carry this rail therewith in a longitudinal direction. Thus by shifting the lever transversely it can be made to engage or disengage the rail 75 and when shifting the lever 79 longitudinally it will always move the yoke 61 therewith and will move the rail 75 therewith when engaged. Thus when the rail 75 is shifted to move the idler reverse gear 40 into mesh with the gears 34 and 38 clutch A will also be engaged through actuation of the yoke 61, however, clutches A or B can be engaged or disengaged by the clutch structure by fore and aft movement of the shift lever when the rail 75 is not engaged thereby.

The shift rail 74 for controlling the rear clutches is actuated by fluid pressure means under control of the shift lever 79, and by shifting the lever a desired drive can be established through the change speed gearing to obtain four forward speeds and a reverse drive. The rail 74 is provided with a slot 90 in which a lever 91 engages to shift the rail fore and aft when operated. This lever is pivotally mounted upon a boss 92 formed on the casing 23 and it is also pivotally connected to a rod 93 that extends into a power cylinder 94 wherein it is fixed to piston 95. This cylinder is preferably pivotally connected at 96 to a bracket 97 fixed to one side of casing 22. As a means of motive power for the piston, the cylinder is connected with the intake manifold 98 of the engine by a conduit system that includes a control valve casing 99 formed preferably as an inner part of casing 22. In this casing 99 is a plunger control valve 100 that is connected by a link 101 to the shift lever extension 82 and the connection between the link and the lever is preferably in the form of a ball joint, as indicated at 102, so that the valve is not influenced by fore and aft movements of the shift lever. Various connections other than that described can be provided for operating the valve through means of the lever.

Between the intake manifold and the valve casing 99 is a conduit 103, and between the valve casing and the cylinder 94 are three conduits 104, 105 and 106. The conduit 104 opens to the interior of the cylinder adjacent its rear end, the conduit 105 opens to the interior of the cylinder approximately centrally between its ends and the conduit 106 opens to the interior of the cylinder adjacent its forward end. These three conduits 104, 105 and 106 are connected with individual ports through the wall of the valve casing and the valve 100 is formed with an angular opening 107 to selectively establish communication between the conduit 103 and any one of the conduits 104, 105 or 106. Within the valve casing is a spring 108 that urges the valve toward the lever extension 82 to normally keep the lever rocked to the high speed position. The valve casing is also provided with a pair of vents 109 that align with conduits 104 and 105 and the valve is formed with a pair of circular recesses 110 in order to selectively open the ends of the power cylinder to atmosphere.

When clutches A and C are engaged first speed forward drive will result and when clutches B and C are engaged second speed forward will be established. Engagement of clutches A and D will establish third speed forward drive through the change speed gearing and overdrive will be established when clutches B and D are engaged. Reverse drive is obtained through the mechanism when clutch A is engaged and the pinion 40 is moved into engagement with gears 34 and 38. When the clutches are disengaged then the change speed gearing will be in neutral position and thus the main clutch can be dispensed with if desired.

The rear clutches C and D are operated by fluid pressure and the control valve for the pressure system is so related that the fluid system is opened to the selected rear clutch to be engaged prior to engagement of the selected forward clutch. The relation of the fluid control is such that while the lever is moving through the gate portion of the H-control plate the valve will be shifted to allow the pressure system to function and thereby shift the rail 74 slightly prior to the manual shifting of the rail 73. A similar arrangement exists between the shifting of rails 73 and 75. The organization of the levers is such that the rail 75 will be actuated to move the reverse pinion 40 into engagement with the gears 34 and 38 prior to the engagement of clutch A.

Figure 8:
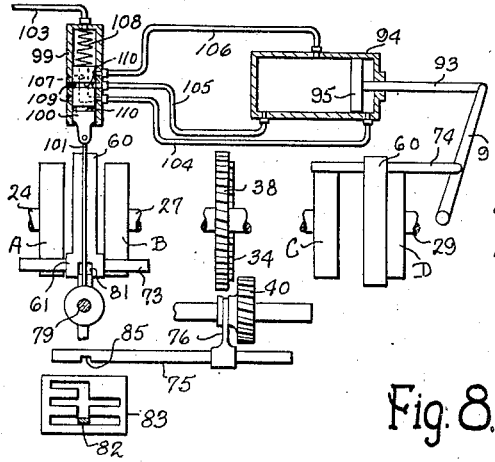
Fig. 8 is a diagrammatic illustration of the change speed mechanism as it is controlled when in neutral position.
Figure 9:
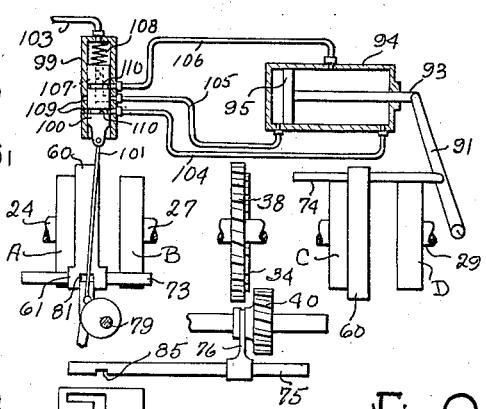
Fig. 9 is a similar diagrammatic view of the mechanism in first speed forward drive.

When the shift lever lies in the central portion of the gate in the H-slot of the control plate 83, as shown in Fig. 8, the clutches A, B, C and D will be disengaged. To obtain first speed forward drive through the change speed gearing, engagement of clutches A and C is made and the drive will be through clutch element 45, the shaft 27, the gears 35, 32, 33 and 36, the clutch elements 67 and 58, and the drum 65 to the tail shaft 29. The shift lever extension must be placed in a position in the slot in the control bracket 83 as shown in Fig. 9. As the lever extension is moved laterally in the gate of the H-slot to a point where it aligns with the slot in which it is to enter, the valve 100 will be moved by line 101 to a position such that the opening 107 connects conduit 105 with conduit 103 and opens conduit 104 to atmosphere, the pressure differential in the power cylinder thereby moving the piston 95 forwardly to engage clutch C. After the clutch C is engaged, rearward movement of the upper portion of the lever will shift the lever extension forwardly in the control bracket slot, as shown in Fig. 9, and such forward movement of the lever extension will move the shift rail 73 forwardly and thereby engage clutch A. Under such circumstance the valve would be in the position shown in Figs. 7 and 9 and the conduit 104 leading to the rear of the cylinder will be open to atmospheric pressure because one of the grooves 110 will align with one of the ports 109 in the valve casing and the pressure differential at the two sides of the piston will of course move it to its forward position. Whenever the lever extension lies in the gate of the control bracket 83 the valve will be open to one of the conduits 105, 104 and 106 or it will lie with its opening 107 intermediate such conduits so that clutches C or D will be engaged or disengaged.

Figure 10:
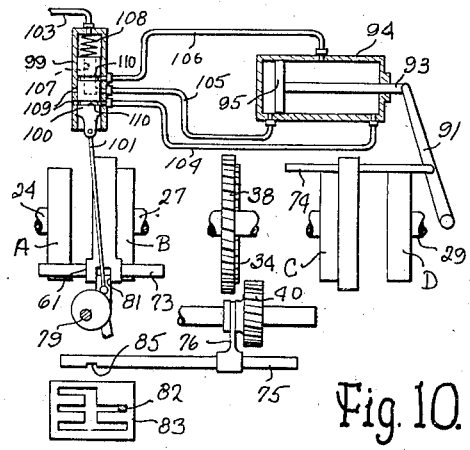
Fig. 10 is a similar diagrammatic view of the mechanism in second speed forward drive.

When second speed forward drive is desired clutches B and C are engaged so that the drive will pass from shaft 24 to the drum 47 and through the front shiftable clutch structure to the clutch element 46, thus driving gear 43 and the gear cluster mounted on the lay shaft 30. Engagement of the clutch C will transmit the drive from the gear cluster to the tail shaft in the same manner as when first speed forward is established, that is through gears 33, 36, clutch elements 67 and 58 and the rear drum 65. When shifting to such position the shift lever is rocked longitudinally in an opposite direction to that in which it is rocked when first speed forward is established so the upper portion of the lever will be moved forwardly thus shifting the extension of the lever rearwardly in the slot opposite the first speed forward slot, see Fig. 10. The lever is moved transversely to first locate the valve 100 in the same position as it is in Fig. 7 when first speed forward is established and hence the power piston 94 moving the shift rail therewith to its forward position for engaging clutch C. The extension of the shift lever is then moved rearwardly and moves the shift rail 73 therewith to engage clutch B.

Figure 11:
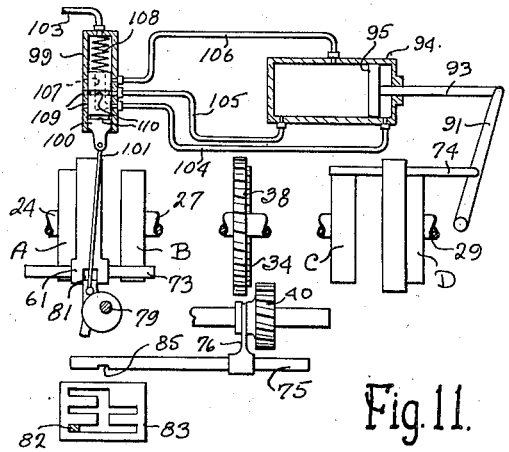
Fig. 11 is a similar diagrammatic view of the mechanism shown in third speed forward drive.

When third speed forward is desired clutches A and D are engaged, see Fig. 11, so that the drive is from the drum 47 to the clutch elements 58 and 45, the shaft 27, the clutch elements 68 and 58 and the drum 65 to the tail shaft 29. To obtain this drive the shift lever is moved to the position shown in Fig. 11 and in so doing, movement of the lever in the gate of the slot will establish communication between conduits 104 and 103 and will open conduit 105 to atmosphere through a recess 110 and a port 109 so that the piston will be moved rearwardly and will move the shift rail 74 in the same direction to engage clutch D. Upon forward movement of the lever extension and by rearward movement of the upper part of the lever, the shift rail 73 will be moved to engage clutch A.

Figure 12:
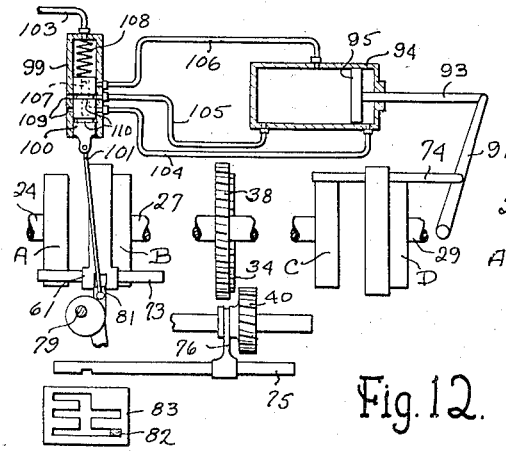
Fig. 12 is a similar diagrammatic view of the mechanism, in overdrive or fourth speed forward position.

The gearing is so arranged that fourth speed forward is of an overdrive type and to obtain this drive the shift lever is moved to the position shown in Fig. 12 thereby engaging clutches B and D. Under such circumstance the valve 100 is first moved to establish communication between conduit 104 and 103 which opens the conduit 105 to atmosphere. The piston 95 thus moved to the rear of the cylinder and clutch D will be engaged. Rearward movement of the shift lever will then engage the forward shiftable clutch element with the clutch element 46 so the drive will be from the drum 47 through the clutch elements 58 and 46 to the gear 43 and from gear 43 to the gear cluster. Power is transmitted from the gear cluster to gear 35 and through the clutch elements 68 and 58 to the drum 65 which is fixed to the tail shaft 29.

Figure 13:
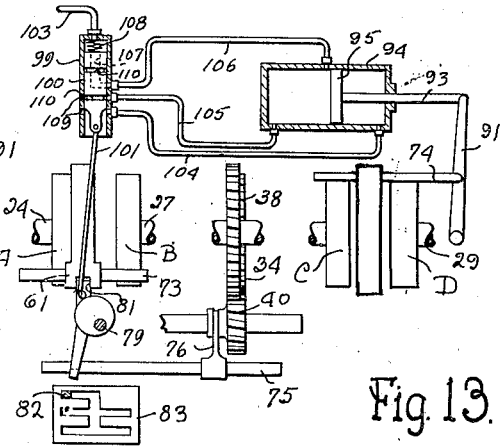
Fig. 13 is a similar diagrammatic view of the mechanism shown in reverse position.

When reverse drive is desired the lever is moved into the position shown in the slotted keeper plate as in Fig. 13. In order for the lever to assume this position it was necessary for the operator to move the lever transversely to the right end of the gate whereupon the action of spring 86 will be overcome and the lever extension 82 will engage the slot 85 in the shift rail 75. At the same time the lever extension retains its actuating relation in the groove 81 of the clutch yoke 61. This transverse positioning of the lever moves the valve 100 into a position where the passage 107 communicates with conduit 106 and hence the piston 95 will be moved to central or neutral position so that neither of the rear clutches will be engaged. Forward movement of the lever extension first meshes the idler 40 with gears 38 and 34 and then engages clutch A. The drive will then be from drum 47 to clutch elements 58 and 45 to shaft 27, through gears 35, 32, 34, 40 and 38 to drum 65 fixed to the tail shaft.

It will be seen that four forward drives and a reverse drive can be selectively obtained by means of two pairs of clutch means upon the operation of a lever that controls one pair of clutch means and controls power means that controls the other pair of clutches.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a change speed gearing, a pair of clutches including shiftable means for establishing two driving ratios, a shiftable idler gear for establishing reverse drive, a rail connected to shift said shiftable clutch means, a rail connected to shift said idler, a manually operable lever constantly operatively engaging said clutch shifting rail and engageable with said idler gear shift rail, and a spring normally retaining said lever out of engagement with said idler gear shift rail, movement of said lever in one direction when held in engagement with the idler gear shift rail shifting both rails to engage one clutch and the idler gear.

2. In a change speed gearing for motor vehicles, control mechanism comprising two pairs of clutches operable to select one of a plurality of driving ratios in the gearing, each pair having means shiftable to establish a plurality of drive ratios, a manually operable lever, mechanism connecting said lever directly with one of said shiftable means, power means for actuating the other shiftable means, a slide valve for controlling said power means, a direct connection from the lever to the valve, and a spring acting against said valve to normally urge the lever into position establishing the highest speed ratio establishing position of the shiftable clutch means.

3. In a change speed gearing for motor vehicles, control mechanism comprising two pairs of clutches operable to select one of a plurality of driving ratios in the gearing, shiftable means for each pair of clutches operable to establish a plurality of speed ratios, a fixed bracket having an H-slot therein, a manually operative lever having an extension projecting through the H-slot in the bracket, a shift rail connected to operate one of said shiftable clutch means, a mechanism directly connecting the lever with said rail, a second shift rail connected to operate the other shiftable clutch means, power operated mechanism connected to actuate the second shift rail, a valve controlling said power operated mechanism, and a connection between the lever and the valve whereby the valve is shifted upon movement of the lever extension in a direction lengthwise of the gate in the H-slot of the bracket to operate the second rail, the first mentioned rail being shifted upon movement of the lever extension in the end slot portions in the bracket.

4. In a change speed gearing for motor vehicles having gearing through which a plurality of driving speeds can be established, control mechanism for establishing the drive through the gearing comprising shiftable clutch members each operable to establish two driving speeds, a lever connected to actuate one of said shift members, a reverse idler gear adapted to be shifted into and out of operative relation in the gearing by said lever concurrently with the shift of said member connected to the lever in one of its engagements, power means for actuating the other clutch shift member, a valve controlling said power means connected to be actuated by said lever, said valve being moved by said lever to shut off said power means when said reverse idler is shifted into operative relation.

5. In change speed gearing for motor vehicles, control mechanism comprising two clutch structures operable to select one of a plurality of forward driving ratios in the gearing, a shiftable idler gear for establishing reverse drive, separate mechanisms operable to shift the clutch structures and the idler gear, a manually operable lever connected to one of the clutch shifting mechanisms and to the idler gear shift mechanism for actuating the same, vacuum power means connected to operate the other clutch structure shifting mechanism, a valve in the vacuum power means shiftable in opposite directions to control the direction of power application to the associated clutch structure shift mechanism, said valve having a neutral position in which the power application is shut off, and tn actuator connection between the valve and the lever.

6. In a change speed gearing for motor vehicles, a pair of clutch members each shiftable into two driving relations with the gearing to establish two driving speeds, a reverse drive idler gear shiftable into and out of driving relation with the gearing, a pivoted lever movable in one path transversely of the vehicle and in three paths longitudinally of the vehicle, a direct connection between the lever and one of the clutch members responsive to longitudinal movement of the lever, idler gear shift mechanism adapted to be engaged by said lever at one end of its transverse movement and movable with the direct clutch member connection, power means for actuating the other clutch member, a control valve for the power means directly connected to the lever and responsive to its movement transversely of the vehicle to engage the associated clutch member when the lever is in two of the three positions of longitudinal movement, said valve rendering said power means ineffective to engage the associated clutch member when the lever is moved into engagement with the idler gear shift mechanism.

7. In a change speed gearing for motor vehicles, control mechanism comprising two pairs of clutches selectively engageable to establish any one of a plurality of driving ratios in the gearing, shift means connected with each pair of clutches, a shift lever, mechanism operatively connecting said lever with one of said shift means, power means operatively connected with the other of said shift means, means controlling effective operation of said power means, means operatively connecting the lever to the power control means, and means acting between said power control means and said lever to normally urge the lever into position establishing the highest speed ratio establishing position of the shift means.

JESSE G. VINCENT.